(12) United States Patent
Ono et al.

(10) Patent No.: US 7,870,785 B2
(45) Date of Patent: Jan. 18, 2011

(54) POSITIVE DISPLACEMENT FLOWMETER

(75) Inventors: Seigo Ono, Tokyo (JP); Katsuichi Uchida, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 12/735,276

(22) PCT Filed: Mar. 6, 2008

(86) PCT No.: PCT/JP2008/054019

§ 371 (c)(1),
(2), (4) Date: Jun. 28, 2010

(87) PCT Pub. No.: WO2009/093342

PCT Pub. Date: Jul. 30, 2009

(65) Prior Publication Data

US 2010/0281970 A1    Nov. 11, 2010

(30) Foreign Application Priority Data

Jan. 24, 2008    (JP) .............................. 2008-013529

(51) Int. Cl.
*G01F 3/04* (2006.01)
(52) U.S. Cl. ...................................... 73/261
(58) Field of Classification Search .................. 73/261, 73/861.03
See application file for complete search history.

(56) References Cited

U.S. PATENT DOCUMENTS 5,050,094 A * 9/1991 Kitano ..................... 702/45

FOREIGN PATENT DOCUMENTS

| JP | 57-069211 | 4/1982 |
| JP | 60-166775 | 8/1985 |
| JP | 63-191923 | 8/1988 |
| JP | 2000-346689 | 12/2000 |
| JP | 2001-027560 | 1/2001 |
| JP | 3310239 | 5/2002 |

* cited by examiner

*Primary Examiner*—Jewel Thompson
(74) *Attorney, Agent, or Firm*—Jordan and Hamburg LLP

(57) ABSTRACT

A position displacement flowmeter having a pair of non-circular gears in a rolling contact on a pitch line without slippage. The positive displacement flowmeter comprises a casing and a pair of rotors provided in the casing and rotatable around its center axes. The pair of rotors, have a tooth profile curve which is an oval pitch curve itself having a trajectory of contact points on the pitch line, and they satisfy a condition of $r_1+r_2=K=\text{const}$ $r_1\,d\theta_1 = r_2\,d\theta_2$, and a moving radius of the oval pitch curve is given by $r_i = a/(1-b\cos n\theta_i)$ $(i=1, 2)$, where "$r_i$ $(i=1, 2)$" is the moving radius that is a distance from a center of rotation to the oval pitch curve, "a" is a homothetic coefficient, "b" is a flattening, "n" is a number of lobes, and "$\theta_i$ $(i=1, 2)$ is a moving angle.

6 Claims, 4 Drawing Sheets

(A)

(B)

(A)

$\theta 1=0°, \theta 2=0°$ (B)

$\theta 1=10.00°, \theta 2=20.00°$ (C)

$\theta 1=15.00°, \theta 2=23.86°$ (D)

$\theta 1=18.00°, \theta 2=25.46°$ (E)

$\theta 1=24.00°, \theta 2=27.94°$ (F)

$\theta 1=30.00°, \theta 2=30.00°$ (A)

$\theta 1=0°, \theta 2=0°$ (B)

$\theta 1=10.53°, \theta 2=6.00°$ (C)

$\theta 1=13.97°, \theta 2=9.00°$ (D)

$\theta 1=18.53°, \theta 2=15.00°$ (E)

$\theta 1=20.23°, \theta 2=18.00°$ (F)

$\theta 1=22.50°, \theta 2=22.50°$

POSITIVE DISPLACEMENT FLOWMETER

TECHNICAL FIELD

The present invention relates to a positive displacement flowmeter and, more particularly, to a positive displacement flowmeter using a pitch curve itself of non-circular gears as a rotor tooth profile.

BACKGROUND OF THE INVENTION

A locus of a contact point of external gear tooth profiles making continuous contact generally forms a lemniscate loop curve and if this loop is flattened toward a center line between axes and coincides with the center line, the contact point moves on the center of both gears. Therefore, the tooth profile has a contour that achieves rolling motion, which corresponds to a pitch curve of non-uniform speed gear (non-circular gear).

A contour of a rolling contact wheel which has a constant center distance and an angular velocity ratio that varies during rotation is a non-circular curve and a non-circular gear is a gear provided with teeth using this non-circular curve as a pitch curve to ensure transmission. A transmissible tooth profile is generally provided on the pitch curve. This tooth profile may be involute, cycloidal/trochoidal, Novikov, or a combination thereof, each of which has drawback and advantage.

For example, a helical gear positive displacement flowmeter described in Patent Document 1 uses a single-point continuous contact tooth profile of a single curve. The single-point continuous contact tooth profile is ideal for a rotor tooth profile of a flowmeter since higher surface pressure bearing strength is expected due to convex/concave contact of tooth surfaces and no trapping phenomenon occurs which is disadvantageous to a flowmeter. However, the single-point continuous contact tooth profile represented by a sine-curve gear has a helical shape due to a contact ratio and the tooth height ratio is limited to 0.785 m, i.e., nm/4 (m: module) if formed by a single curve. This is disadvantageous to a rotor of a flowmeter in aspect of function or production.

On the other hand, a pitch curve of a non-circular gear is considered as an ideal tooth profile curve that enables the continuous contact and the rolling contact instead of slide contact between tooth profiles as a gear tooth profile. It is assumed that a tooth profile of a flowmeter rotor is formed by a pitch curve (rolling-contact curve) of an oval gear that is a type of non-circular gears. In this case, it is known that the tooth profile does not act as a gear since a tooth profile for certainly transmitting the rotation is not included.

Patent Document 1: Japanese Patent Publication No. 3310239

However, in the case of rotors of a positive displacement flowmeter housed as a pair in a measuring chamber of the flowmeter to transmit rotation through energy of fluid, although the torque transmission is switched at a position of the equal diameters where the torques are theoretically equalized and a tooth surface on the opposite side comes into contact, if an appropriate gap considered as an apparent backlash may be formed, abnormal engagements may be reduced and the tooth profiles making the rolling contact may be realized. However, in a conventional positive displacement flowmeter, the technical idea as described above for using the tooth profile with the rolling-contact curve as the rotor does not exist and has not been realized.

The present invention was conceived in view of the above situations and it is therefore the object of the present invention to provide a positive displacement flowmeter having a pair of non-circular gears making rolling contact without slip on a pitch line.

SUMMARY OF THE INVENTION

To solve the problem, a first technical means of the present invention is a positive displacement flowmeter provided with a pair of non-circular gears in a casing, wherein the pair of the non-circular gears has an oval pitch curve itself having a locus of a contact point on a pitch line as a tooth profile curve and satisfies conditions of $r_1+r_2=K=const.$, and $r_1 \cdot d\theta_1 = r_2 \cdot d\theta_2$, and a moving radius of the oval pitch curve is represented by $r_i = a/(1-b \cos n\theta_i)$ (i=1, 2)

(where $r_i$ (i=1, 2) denotes a moving radius that is a distance from the rotation center to the oval pitch curve, and a, b, n and $\theta_i$ (i=1, 2) denote similarity coefficient, flattening, number of lobes, and moving angle, respectively).

A second technical means is the first technical means wherein the pair of the non-circular gears has a spur shape.

A third technical means is the first or second technical means wherein when the pair of the non-circular gears is in an engaged state at an equivalent radius position, a gap is provided between tooth shapes on long radius side of one of the non-circular gears and short radius side of the other non-circular gear.

A fourth technical means is any one of the first or second technical means wherein the pair of the non-circular gears is made up of the same shaped non-circular gears.

A fifth technical means is any one of the first to fourth technical means wherein the number of lobes n and the flattening b are set to 6 and 0.5, respectively, in the equation $r_i = a/(1-b \cos n\theta_i)$ (i=1, 2) representing the moving radius of the oval pitch curve.

A sixth technical means is any one of the first or second technical means wherein the number of lobes n and the flattening b are set to 8 and 0.34, respectively, in the equation $r_i = a/(1-b \cos n\theta_i)$ (i=1, 2) representing the moving radius of the oval pitch curve.

According to the present invention, excellent abrasion resistance is achieved since a pair of non-circular gears of a positive displacement flowmeter makes rolling contact without slip on a pitch line; a higher torque efficiency is achieved since a larger value can be given to a tooth height ratio; and it is possible to form the gears in spur shape instead of helical shape while avoiding abnormal engagement since apparent backlash is provided.

EXPLANATIONS OF LETTERS OR NUMERALS 1, 2 . . . rotor; 3 . . . casing; 4, 5 . . . axial center; 6, 7 . . . virtual pitch circle; and 8, 9 . . . addendum circle

DESCRIPTION OF PREFERRED EMBODIMENTS

Preferred embodiments of a positive displacement flowmeter of the present invention will now be described with reference to the accompanying drawings.

Figure 1:
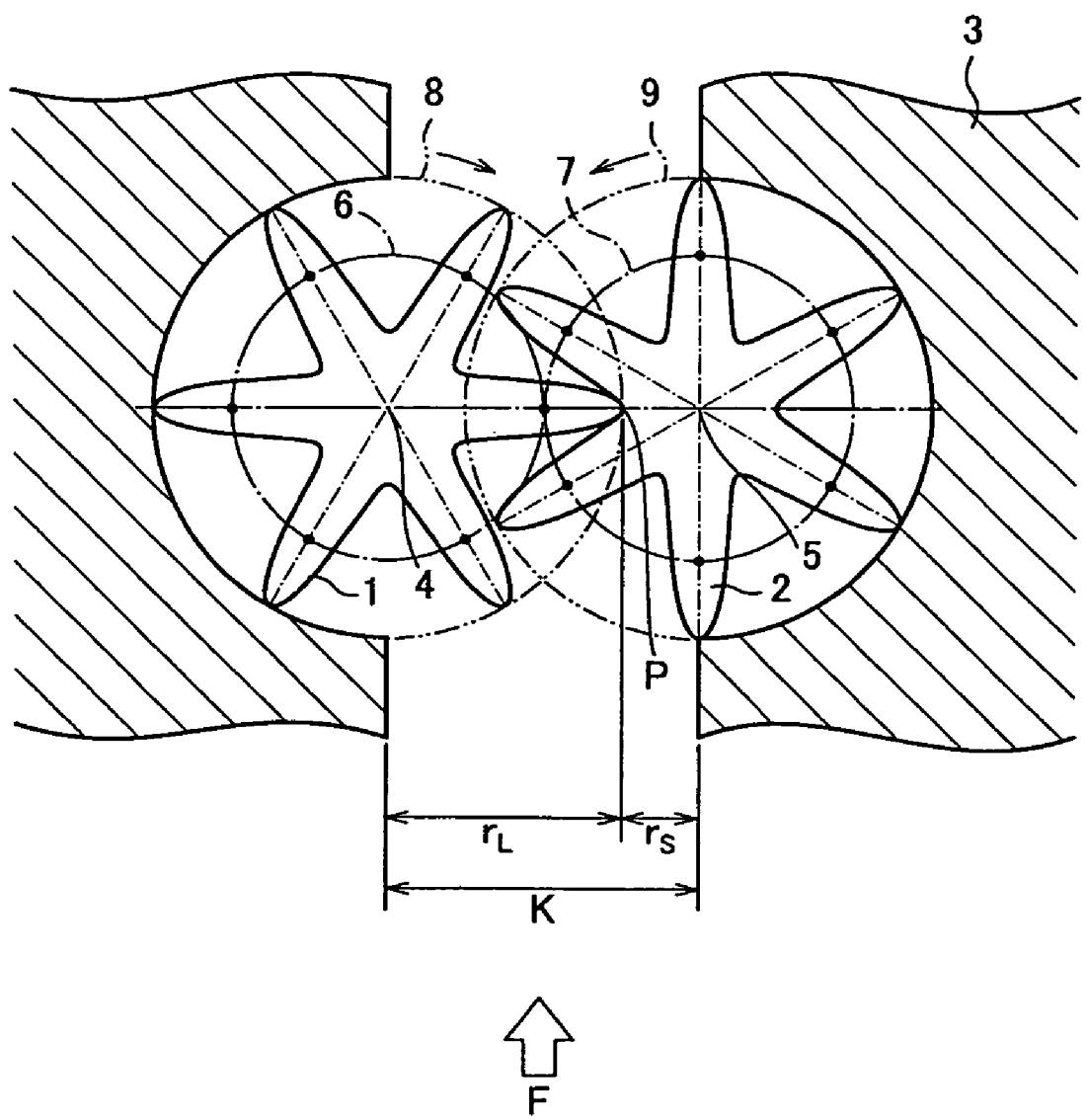
FIG. 1 is a diagram of an exemplary configuration of a positive displacement flowmeter according to one embodiment of the present invention.
Figure 2:
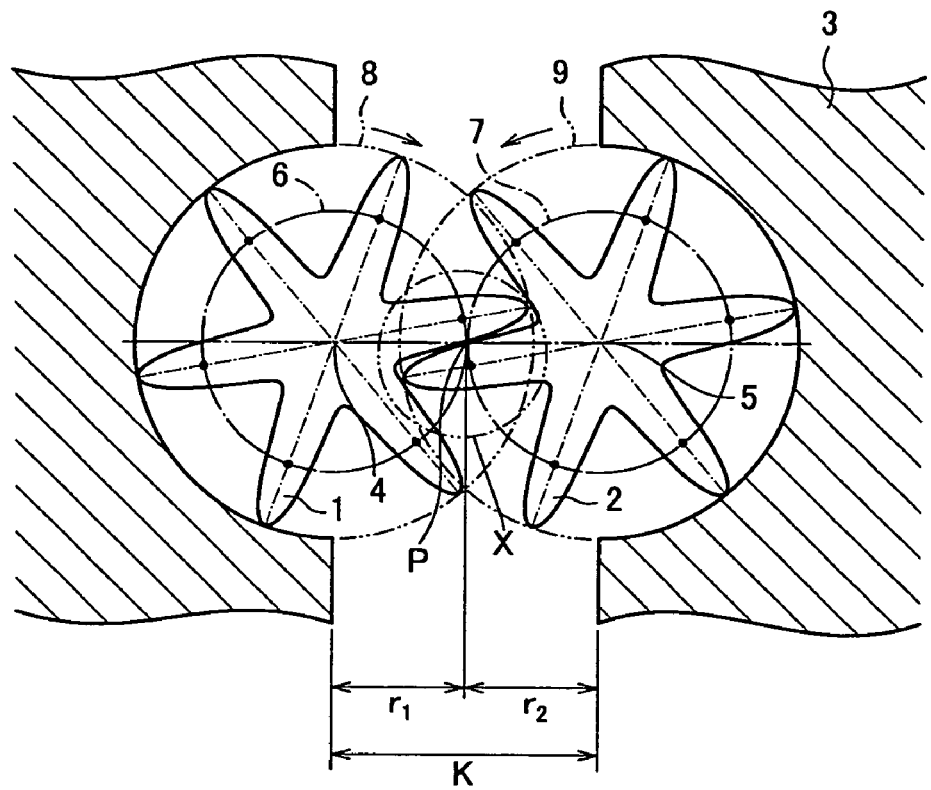
FIG. 2 is a diagram of an example of an engagement state at an equivalent radius position in the case of the number of lobes n=6.
Figure 2:
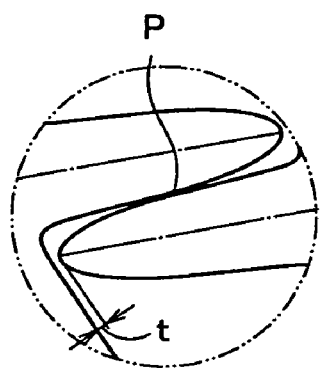

FIG. 1 is a diagram of an exemplary configuration of a positive displacement flowmeter according to one embodiment of the present invention. In FIGS. 1, 1 and 2 denote a pair of rotors; 3 denotes a casing; 4 an 5 denote axial centers of the rotors 1 and 2, respectively; 6 denotes a virtual pitch circle of the rotor 1; 7 denotes a virtual pitch circle of the rotor 2; 8 denotes an addendum circle of the rotor 1; and 9 denotes an addendum circle of the rotor 2. A pair of the rotors 1, 2 is housed in the casing 3 of the positive displacement flowmeter rotatably around the axial centers 4, 5. The rotors 1, 2 are formed in spur shape and use a tooth profile curve that is an oval pitch curve itself having a locus of a contact point P on a pitch line that links the axial centers 4 and 5 and satisfy the following rolling contact condition:

$r_1 + r_2 = K = const.$, and $r_1 \cdot d\theta_1 = r_2 \cdot d\theta_2$ where $r_1$, $r_2$ denote moving radii that are distances from the rotation center to the oval pitch curve and $\theta_1$, $\theta_2$ denote moving angles.

The moving radius is represented by the following Eq. (1) for the oval pitch curve that is a rolling contact curve (closed curve), where a, b, n and $\theta_i$ denote a homothetic coefficient, a flattening, a number of lobes, and a moving angle, respectively.

$r_i = a/(1 - b \cos n\theta_i)$ $(i=1, 2)$ \hfill Eq. (1)

A long radius $r_L$ and a short radius $r_S$ are represented by the following Eq. (2) and Eq. (3).

$r_L = a/(1-b)$ \hfill Eq. (2)

$r_S = a/(1+b)$ \hfill Eq. (3)

Since a larger discharge amount per rotation is required in the case of the positive displacement flowmeter, it is desirable to reduce the number of teeth as much as possible and it is desirable to increase a long/short radius ratio ($r_L/r_S$) to increase the torque efficiency. However, since a fewer number of teeth problematically causes abnormal engagement due to second interference and a larger long/short radius ratio problematically causes the deterioration of strength of the gears, a balance must be achieved between the number of teeth and the long/short radius ratio. The second interference is interference generated by substantial portions of tooth shapes with each other at an irrelevant position other than the contact point P in the course of movement of the contact point P along a given locus.

In the following examples, the number of lobes n is an even number and results of simulations will be described with a representative example of n=6. When a center distance K, i.e., a distance between the axial centers 4 and 5 is set to 10 mm and the flattening b is set to 0.5, the homothetic coefficient a is obtained as 3.75 from the following Eq. (4). In this case, the long/short radius ratio is $r_L/r_S = 3.0$.

$a = K(1-b^2)/2$ \hfill Eq. (4)

A simulation result will be described for the case of the center distance K=10 mm and the parameters of Eq. (1), the number of lobes n=6, the flattening b=0.5, and the homothetic coefficient a=3.75 with reference to FIGS. 1 and 2. In the case of this example, it is assumed that the rotors 1, 2 are made up of the same shaped non-circular gears.

FIG. 1 exemplarily illustrates a state of engagement at a long/short radius position in the case of the number of lobes n=6. In this case, if a pair of the rotors 1, 2 is disposed within fluid F, rotation torques are generated in both of the rotors 1, 2. In general, the engagement (contact) generates more torques from the short radius $r_s$ to the long radius $r_L$ and the switching point is at the equivalent radius position depicted in FIG. 2(A), i.e., a position having equivalent radii ($r_1 = r_2$) where the torques are equivalent to each other. Therefore, if the fluid F flows in the direction of an arrow (upwardly), the torque is greater in the right rotor 2 than the left rotor 1 in the state of FIG. 1 and, therefore, the right rotor 2 acts as the driving side to rotate the left rotor 1 in the direction of arrows in FIG. 1.

FIG. 2(A) is a diagram of an example of the engagement state at the equivalent radius position in the case of the number of lobes n=6. FIG. 2(B) is an enlarged diagram of an X portion of FIG. 2(A).

As depicted in FIG. 2(A), when the engagement (contact) of the rotors 1, 2 comes to the equivalent radius position ($r_1 = r_2$), the torques of the rotors 1, 2 become equivalent and the left rotor 1 is instantaneously switched to the driving side from this state. Like this, in the case of the number of lobes n=6, it is known that the second interference does not occur on the substantial side in either the contact state at the long/short radius position ($r_1 \cdot r_2$) depicted in FIG. 1 or the contact state at the equivalent radius position ($r_1 = r_2$) depicted in FIG. 2.

As shown in FIG. 2(B), when a pair of the rotors 1, 2 is in the engagement state at the equivalent radius position ($r_1 = r_2$), a gap is provided between the long radius side of the rotor 2 and the short radius side of the rotor 1. This gap is referred to an apparent backlash (hereinafter, apparent backlash t). The apparent backlash t is about 0.12 mm when measured in the engagement state at the equivalent radius position. The center distance K in this case is 10 mm.

As above, excellent abrasion resistance is achieved since a pair of non-circular gears of a positive displacement flowmeter makes rolling contact without slip on a pitch line; a higher torque efficiency is achieved since a larger value is given to a tooth height ratio; and it is possible to from the gears in spur shape instead of helical shape while avoiding abnormal engagement since the apparent backlash is provided.

Figure 3:
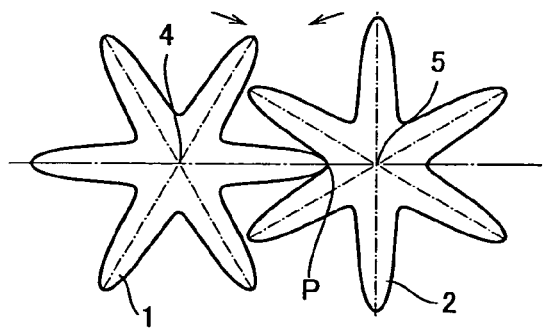
FIG. 3 is a diagram of a transition example of an engagement state of a pair of rotors in the case of the number of lobes n=6.
Figure 3:
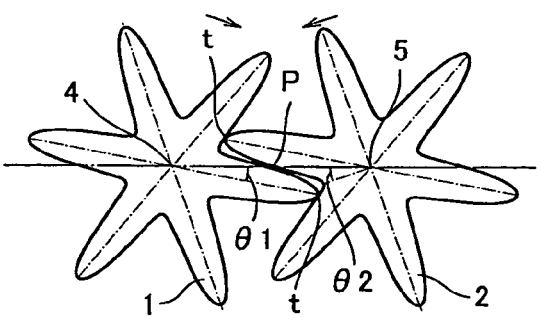
Figure 3:
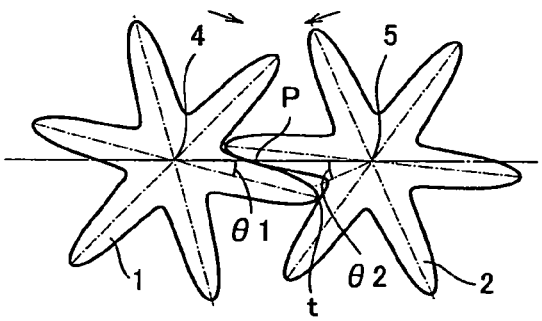
Figure 3:
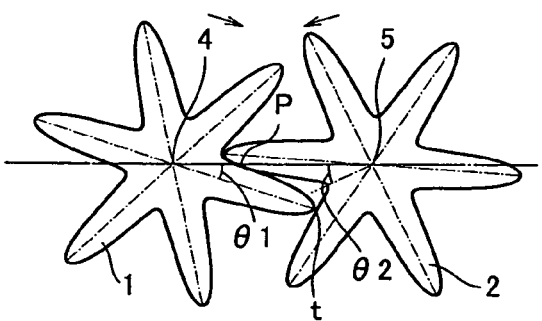
Figure 3:
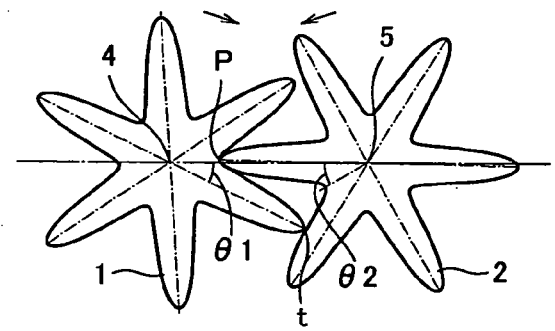
Figure 3:
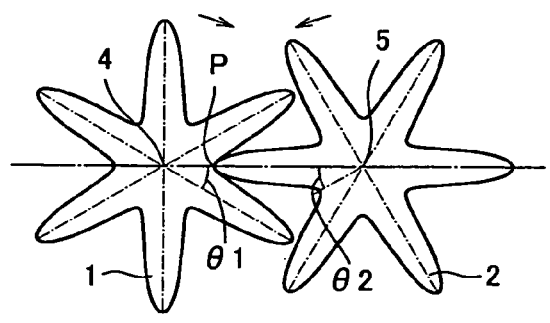

FIG. 3 is a diagram of a transition example of the engagement state of a pair of the rotors 1, 2 in the case of the number of lobes n=6. The transition of the engagement state is depicted when the rotors 1, 2 rotate from 0° to 30° in the order of FIG. 3(A) to FIG. 3(F). In FIG. 3, P denotes the contact point of the rotors 1, 2 and t denotes the apparent backlash between the rotors 1, 2. Although the rotors 1 and 2 are housed in the casing 3 rotatably around the axial centers 4 and 5, the casing 3 is not illustrated.

FIG. 3(A) shows the case when the angle θ1 of the rotor 1 is 0° and the angle θ2 of the rotor 2 is 0°; FIG. 3(B) shows the case when the angle θ1 of the rotor 1 is 10.00° and the angle θ2 of the rotor 2 is 20.00°; and FIG. 3(C) shows the case when the angle θ1 of the rotor 1 is 15.00° and the angle θ2 of the rotor 2 is 23.86°.

FIG. 3(D) shows the case when the angle θ1 of the rotor 1 is 18.00° and the angle θ2 of the rotor 2 is 25.46°; FIG. 3(E) shows the case when the angle θ1 of the rotor 1 is 24.00° and the angle θ2 of the rotor 2 is 27.94°; and FIG. 3(F) shows the case when the angle θ1 of the rotor 1 is 30.00° and the angle θ2 of the rotor 2 is 30.00°. In FIG. 3(D), the apparent backlash t is minimized and the measured value thereof is about 0.07 mm.

Although the embodiment has been described as a representative example when the number of lobes n is 6, the present invention may be implemented by appropriately setting the flattening b even when the number of lobes n is 8. For example, in the case of the number of lobes n=8, the flattening b is set to 0.34. The measured value of the apparent backlash t in this case is about 0.02 mm (minimum value).

Figure 4:
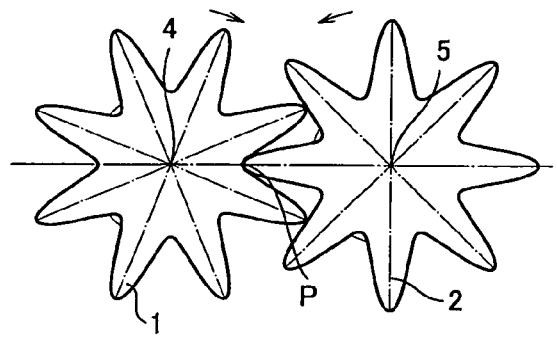
FIG. 4 is a diagram of a transition example of an engagement state of a pair of rotors in the case of the number of lobes n=8.
Figure 4:
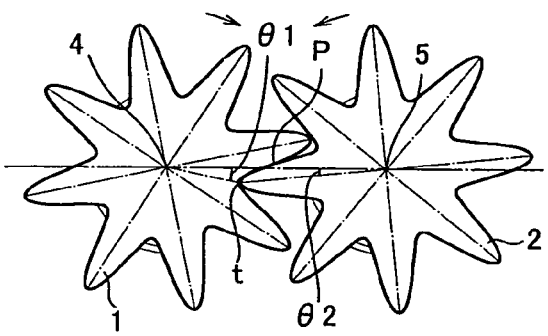
Figure 4:
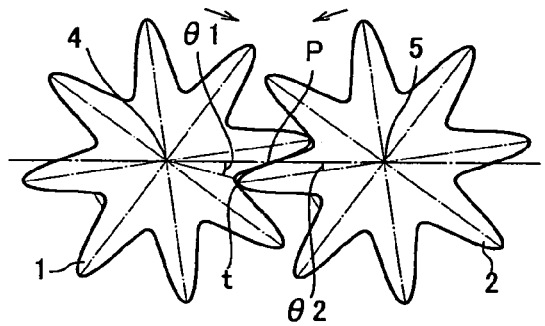
Figure 4:
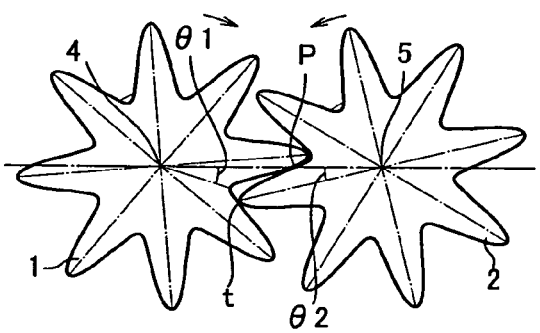
Figure 4:
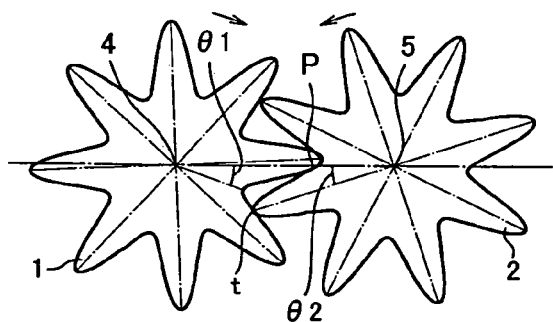
Figure 4:
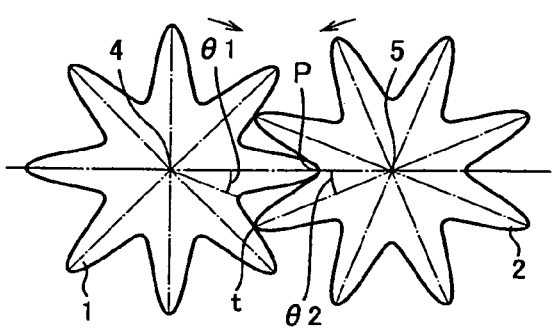

FIG. 4 is a diagram of a transition example of the engagement state of a pair of the rotors 1, 2 in the case of the number of lobes n=8. The transition of the engagement state is depicted when the rotors 1, 2 rotate from 0° to 22.5° in the order of FIG. 4(A) to FIG. 4(F). In FIG. 4, P denotes the contact point of the rotors 1, 2 and t denotes the apparent backlash between the rotors 1, 2. Although the rotors 1 and 2 are housed in the casing 3 rotatably around the axial centers 4 and 5, the casing 3 is not illustrated.

FIG. 4(A) shows the case when the angle θ1 of the rotor 1 is 0° and the angle θ2 of the rotor 2 is 0°; FIG. 4(B) shows the case when the angle θ1 of the rotor 1 is 10.53° and the angle θ2 of the rotor 2 is 6.00°; and FIG. 4(C) shows the case when the angle θ1 of the rotor 1 is 13.97° and the angle θ2 of the rotor 2 is 9.00°.

FIG. 4(D) shows the case when the angle θ1 of the rotor 1 is 18.53° and the angle θ2 of the rotor 2 is 15.00°; FIG. 4(E) shows the case when the angle θ1 of the rotor 1 is 20.23° and the angle θ2 of the rotor 2 is 18.00°; and FIG. 4(F) shows the case when the angle θ1 of the rotor 1 is 22.50° and the angle θ2 of the rotor 2 is 22.50°. In FIG. 4(D), the apparent backlash t is minimized and the measured value thereof is about 0.02 mm.

The invention claimed is:

1. A positive displacement flowmeter provided with a pair of non-circular gears in a casing, wherein the pair of non-circular gears has an oval pitch curve itself having a locus of a contact point on a pitch line as a tooth profile curve and satisfies conditions of $r_1 + r_2 = K = const.$, and $r_1 \cdot d\theta_1 = r_2 \cdot d\theta_2$, and a moving radius of the oval pitch curve is represented by $r_1 = a/(1 - b \cos n\theta_1)$ (i=1, 2)

(where $r_i$ (i=1, 2) denotes a moving radius that is a distance from the rotation center to the oval pitch curve, and a, b, n and $\theta_i$ (i=1, 2) denote similarity coefficient, flattening, number of lobes, and moving angle, respectively).

2. The positive displacement flowmeter as defined in claim 1, wherein the pair of the non-circular gears has a spur shape.

3. The positive displacement flowmeter as defined in claim 1 or 2, wherein when the pair of the non-circular gears is in an engaged state at an equivalent radius position, a gap is provided between tooth shapes on long radius side of one of the non-circular gears and short radius side of the other non-circular gear.

4. The positive displacement flowmeter as defined in claim 1 or 2, wherein the pair of the non-circular gears is made up of the same shaped non-circular gears.

5. The position displacement flowmeter as defined in claim 1 or 2, wherein the number of lobes n and the flattening b are set to 6 and 0.5, respectively, in the equation $r_i = a/(1 - bs \cos n\theta_i)$ (i=1, 2) representing the moving radius of the oval pitch curve.

6. The positive displacement flowmeter as defined in claim 1 or 2, wherein the number of lobes n and the flattening b are set to 8 and 0.34, respectively, in the equation $r_i = a/(1 - bs \cos n\theta_i)$ (i=1, 2) representing the moving radius of the oval pitch curve.

* * * * *